United States Patent [19]
Milke et al.

[11] 3,963,954
[45] June 15, 1976

[54] FLUORESCENT LAMP HAVING INDIUM OXIDE CONDUCTIVE COATING AND A PROTECTIVE COATING THEREFOR

[75] Inventors: Howard W. Milke, Danvers; Tadius T. Sadoski, Salem, both of Mass.

[73] Assignee: GTE Sylvania Incorporated, Danvers, Mass.

[22] Filed: Nov. 25, 1974

[21] Appl. No.: 526,557

[52] U.S. Cl. .............................. 313/489; 313/198; 313/221; 313/492
[51] Int. Cl.$^2$ .................. H01J 61/35; H01J 61/42; H01J 61/54
[58] Field of Search .......... 313/485, 488, 489, 492, 313/493, 221, 197, 198

[56] References Cited
UNITED STATES PATENTS

| | | | |
|---|---|---|---|
| 3,067,356 | 12/1962 | Ray | 313/221 |
| 3,599,029 | 8/1971 | Martyny | 313/489 |
| 3,624,444 | 11/1971 | Berthold et al. | 313/221 |
| 3,717,781 | 2/1973 | Sadoski et al. | 313/488 |
| 3,809,944 | 5/1974 | Jongerius et al. | 313/488 X |

*Primary Examiner*—Palmer C. Demeo
*Attorney, Agent, or Firm*—James Theodosopoulos

[57] ABSTRACT

A fluorescent lamp has a transparent electrically conductive indium oxide coating on the inner surface of the fluorescent lamp bulb. A transparent coating of finely powdered titania is disposed on the conductive coating to improve its conductivity and a transparent protective coating of finely powdered aluminum oxide is then disposed on the titania coating.

2 Claims, No Drawings

FLUORESCENT LAMP HAVING INDIUM OXIDE CONDUCTIVE COATING AND A PROTECTIVE COATING THEREFOR

THE INVENTION

This invention concerns fluorescent lamps, that is, low pressure mercury vapor discharge lamps having a glass bulb whose inner surface contains a layer of luminescent material and which has electrodes at each end of the lamp. The invention is particularly concerned with fluorescent lamps having a transparent electrically conductive coating on the inside surface of the lamp.

It is well-known in the fluorescent lamp industry that the starting voltage requirement of a fluorescent lamp is influenced by the bulb wall surface resistance. By using a conductive coat on the inner wall surface, it is possible to reduce the voltage necessary for ignition of a fluorescent lamp.

Various techniques for the formation of a conductive coat are known. For example: the spray application of tin chloride solutions on a hot substrate; the spray application of various tin organic compounds on a hot substrate; the application of indium organic compounds to a cold bulb followed by baking the bulb in an air atmosphere. Such conductive coatings are especially useful in the case of fluorescent lamps which contain an amalgam-forming material and in the case of certain gas mixtures which are well-known to be difficult to start.

However, lamps having such conductive coatings have several disadvantages. One of them is their tendency to reduce lamp maintenance, which is the light output throughout the life of the lamp compared with initial light output. Another disadvantage is the tendency of the conductive coat to discolor and turn gray during lamp life.

We have found that providing a protective layer of aluminum oxide on the conductive layer tends to overcome these disadvantages. The aluminum oxide is applied in a finely powdered form and in a layer that is thin enough so as to be substantially transparent to the visible light emitted by the lamp.

We have further found that where the conductive layer comprises indium oxide, its electrical conductivity can be improved by overcoating it with titania prior to deposition of the protective layer of aluminum oxide.

The formation of a transparent conductive coat can be accomplished by coating the inner surface of the bulb with an aqueous solution of an indium compound such as indium nitrate or indium acetate. The amount of indium compound in the aqueous solution is not critical. Good results have been obtained with saturated solutions, with saturated solutions diluted with an equal amount of water and with saturated solutions with an excess of undissolved indium compound. The addition of a suitable binder, such as polyethylene oxide, to the aqueous solution improves the uniformity of the coating, but is not necessary for satisfactory starting of the lamp.

After coating with the aqueous solution, the bulb may be baked in regular bakers used in the fluorescent lamp industry at temperatures below those that would cause deformation of the glass, and may then be coated with a phosphor coating; or, the application of the phosphor coating may be made without the above mentioned baking step. In general, baking the bulb, prior to phosphor coating, produces lower initial internal resistance in the finished lamps. This invention is further illustrated in the following example.

EXAMPLE 1

A solution containing approximately 40 mg of indium nitrate per ml of water was used to flush-coat the inner surface of a group of 40WT12 glass bulbs. These bulbs were then dried and baked at 500°–600°C prior to phosphor coating and processing into fluorescent lamps. A history of resistance and starting voltage measurements is shown in Table I along with those of control lamps which did not have the conductive coating. These values show the effectiveness of the conductive coating in lowering internal resistance and starting voltage.

TABLE 1

|  | Indium Nitrate Precoat | | Control | |
|---|---|---|---|---|
|  | Range | Average | Range | Average |
| 0 Hour Resistance | $7 \times 10^6$ to $10^8$ ohms | $25 \times 10^6$ ohms | $>10^8$ ohms | $>10^8$ ohms |
| Resistance after 15 minutes lamp operation | $1.2 \times 10^6$ to $25 \times 10^6$ ohms | $5.2 \times 10^6$ ohms | $>10^8$ ohms | $>10^8$ ohms |
| Resistance after 60 minutes lamp operation | $3.3 \times 10^5$ to $3.3 \times 10^6$ ohms | $9.9 \times 10^5$ ohms | $>10^8$ ohms | $>10^8$ ohms |
| Resistance after 100 hours lamp operation | $1.2 \times 10^5$ to $2.2 \times 10^5$ ohms | $1.9 \times 10^5$ ohms | $>10^8$ ohms | $>10^8$ ohms |
| Peak starting voltage requirement for open circuit voltage of 205 volts (rapid start reference circuit). One hour of lamp operation. |  | 143 volts |  | 193 volts |
| Peak starting voltage requirement for open circuit voltage of 205 volts (rapid start reference circuit). 100 hours of lamp operation |  | 143 volts |  | 199 volts |

Initially, that is, after 1 hour lamp operation, the average starting voltage for lamps having the conductive coating was 50 volts lower than the average starting voltage of the control lamps. After 100 hours lamp operation, it was 56 volts lower.

Although the indium was deposited on the bulb as indium nitrate, it was converted to indium oxide during the baking step, since the baking is done in an oxidizing atmosphere. Similarly, when the baking step is omitted, the indium coating is converted to the oxide during lamp processing after the phosphor has been deposited, since the phosphor-coated bulb is processed at about 500°–600°C in an oxidizing atmosphere.

The electrical conductivity of the indium oxide conductive layer can be improved by overcoating it with titania as shown in the following example.

EXAMPLE 2

40WT12 glass bulbs were flush-coated with a solution consisting of approximately 25 mg of indium acetate per mil of water. After drying and baking, some of these bulbs were additionally coated with a liquid containing the following ingredients in the approximate proportions shown below:

| | |
|---|---|
| 8 lbs. 6 oz. | $TiO_2$ (particle size 15–40 millimicrons) |
| 75 grams | $Sb_2O_3$ |
| 68 grams | $Al_2O_3$ (particle size 5–40 millimicrons) |
| 2540 ml | dibutyl phthalate |
| 75 ml | Armeen CD dispersing agent |
| 20 gal. | ethylcellulose vehicle |

The ethylcellulose vehicle consisted of 2.5% ethylcellulose, 1.2% dibutyl phthalate, 84.6% xylol and 11.7% butanol and had a 12 second viscosity.

Following the application of the above coating the bulbs were then dried and baked. By following these procedures, three groups of bulbs were prepared; group X, bulbs coated with indium acetate solution and baked; group Y, bulbs coated with indium acetate solution and baked and then coated with titanium dioxide and baked; group Z, contained no coating (controls). All three groups were then processed into fluorescent lamps. The results of resistance and starting voltage measurements are shown in Table 2. These values clearly show the effectiveness of the titanium dioxide coating in lowering the initial resistance.

An additional feature provided by the titanium dioxide coating is to be found in the appearance of the lamps after a period of burning. After the lamps of group X were burned for 100 hours, the general appearance was poor due to the formation of a dark coating on the inside wall of the lamp. After the same period of burning time, the lamps of group Y were markedly cleaner. U.S. Pat. No. 3,624,444 shows that a transparent protective layer may be produced over a tin oxide conductive coat by the use of a spray application of an organometallic compound containing one of the elements from Group 4 or 5 of the periodic table on a hot bulb whose surface is 450° to 500°C. The method of this invention is much simpler in that it uses equipment already in use in the fluorescent lamp industry, and employs a flush-coat of titanium dioxide in a suitable vehicle applied to a cold bulb and subsequently dried and baked. Furthermore, a titanium dioxide coating is not required to improve the conductivity of a tin oxide conductive coat.

The appearance and maintenance of the group Y lamps may be improved further by overcoating the titania coat with a protective coat of aluminum oxide as illustrated by the following examples. Three groups of lamps were prepared. Group A bulbs were coated with indium acetate, similar to Example 1, and baked to convert the indium to its oxide. Group B bulbs were coated with indium oxide and then titania, as per Example 2, and baked. Group C lamps consisted of group B lamps which were over-coated with a protective layer of powdered aluminum oxide which was applied by flush-coating the inside of the bulb with aluminum oxide suspension. The suspension was prepared by mixing 3 pounds 5 ounces of Alon C, a finely powdered aluminum oxide having a particle size range of 5 to 40 millimicrons, with 15 gallons of ethylcellulose vehicle and 300 cc of Armeen CD, an amine type dispersing agent. The ethylcellulose vehicle consisted of 2.5% ethylcellulose, 1.2% dibutyl phthalate, 84.6% xylol and 11.7% butanol and had a 12 second viscosity.

All these groups were then coated with phosphor and

TABLE 2

| | Group X | | Group Y | | Group Z | |
|---|---|---|---|---|---|---|
| | Range | Average | Range | Average | Range | Average |
| Zero hour resistance | $33 \times 10^6$ to $66 \times 10^6$ ohms | $46 \times 10^6$ ohms | $4.4 \times 10^5$ to $6.2 \times 10^5$ ohms | $5.6 \times 10^5$ ohms | $>10^8$ ohms | $>10^8$ ohms |
| Resistance after 15 minutes burning | $6.2 \times 10^6$ to $2.1 \times 10^6$ ohms | $9.8 \times 10^5$ ohms | $3.6 \times 10^5$ to $5.0 \times 10^5$ ohms | $4.2 \times 10^5$ ohms | $>10^8$ ohms | $>10^8$ ohms |
| Peak starting voltage requirements for open circuit voltage of 205. (Rapid start reference circuit). 15 minutes burning time. | 60% would not start to 300 v 40% started at 143 v | — | 143 volts | 143 volts | 182 to 196 volts | 186 volts | processed into fluorescent lamps. The test results are shown in the following table.

TABLE 3

| | Group A | Group B | Group C |
|---|---|---|---|
| 0 Hour Resistance | 1.2 to 40 megohms | 260 to 400 Kilohms | 440 to 580 Kilohms |
| 0 Hour starting on a two-lamp rapid-start CBM ballast | >135V | 96 V | 96 V |

TABLE 3-continued

|  | Group A | Group B | Group C |
|---|---|---|---|
| (input voltage) 100 Hour Maintenance | 91.5% | 93.2% | 95.4% |

It can be seen that the protective alumina coat had little effect on the conductivity but improved maintenance at 100 hours from 93.2% to 95.4%.

The advantages of the alumina protective coating of this invention are probably due to the fact that the relatively nonporous alumina coating protects the electrically conductive coating from ion bombardment resulting from the arc discharge. Even though the phosphor layer overlays the conductive coating, and is many times thicker than the alumina protective coating, it does not similarly protect the conductive coating from ion bombardment, probably because it is more porous and a poorer electrical insulator than the alumina coating.

The thickness of an alumina coating in accordance with this invention was measured by electron photomicrograph and found to be about 500 nanometers or about 0.02 mils. This is considerably thinner than the alumina coating that is sometimes used in fluorescent lamps to prevent formation of a mercury-alkali discoloration, as disclosed in U.S. Pat. No. 3,067,356. In such cases, the alumina coating is applied directly to the glass and must be at least 0.5 mils thick in order to form a physical-chemical barrier that effectively prevents alkali from the glass from reacting with mercury that is present in the lamp fill.

We claim:
1. In a fluorescent lamp having a glass envelope containing low pressure mercury vapor and an internal coating of luminescent material, the improvement comprising a thin transparent conductive layer of indium oxide on the inner surface of the glass envelope, a thin transparent layer of particulate titanium dioxide on the indium oxide, the titanium dioxide layer improving the conductivity of the indium oxide, a thin transparent protective layer of aluminum oxide on the titanium dioxide and the luminescent material coated on the aluminum oxide layer.
2. The lamp of claim 1 wherein the aluminum oxide layer is about 500 nanometers thick.

* * * * *